US006563494B1

(12) United States Patent
Eichstaedt et al.

(10) Patent No.: US 6,563,494 B1
(45) Date of Patent: May 13, 2003

(54) CUT AND PASTE PEN FOR PERVASIVE COMPUTING DEVICES

(75) Inventors: Matthias Eichstaedt, San Jose, CA (US); John Pete Lazarus, San Jose, CA (US); Qi Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/168,854

(22) Filed: Oct. 8, 1998

(51) Int. Cl.[7] .............................. G09G 5/00; G06K 9/22
(52) U.S. Cl. ........................................ 345/179; 382/313
(58) Field of Search ................................. 345/156, 169, 345/179; 235/472.01, 472.02, 472.03; 361/679; 382/313

(56) References Cited

U.S. PATENT DOCUMENTS

| | | | | |
|---|---|---|---|---|
| 5,729,251 A | * | 3/1998 | Nakashima | 345/179 |
| 5,932,860 A | * | 8/1999 | Plesko | 235/454 |
| 5,938,726 A | * | 8/1999 | Reber et al. | 709/217 |
| 5,939,702 A | * | 8/1999 | Knighton et al. | 235/472.03 |
| 5,940,595 A | * | 8/1999 | Reber et al. | 395/200.57 |
| 5,999,666 A | * | 12/1999 | Gobeli et al. | 382/313 |
| 6,002,387 A | * | 12/1999 | Ronkka et al. | 345/157 |
| 6,002,946 A | * | 12/1999 | Reber et al. | 455/557 |
| 6,105,871 A | * | 8/2000 | Campo et al. | 235/472.03 |
| 6,119,944 A | * | 9/2000 | Mulla et al. | 235/472.03 |
| 6,335,727 B1 | * | 1/2002 | Morishita et al. | 345/179 |
| 6,486,875 B1 | * | 11/2002 | O'Donnell, Jr. | 345/179 |
| 2002/0126105 A1 | * | 9/2002 | O'Donnell, Jr. | 345/179 |

* cited by examiner

*Primary Examiner*—Bipin Shalwala
*Assistant Examiner*—David L Lewis
(74) *Attorney, Agent, or Firm*—John L. Rogitz

(57) ABSTRACT

A stylus includes a wireless transceiver, a processor controlling the transceiver, and a data storage device. Data can be selected on a first computer such as a first personal digital assistant (PDA) and then transmitted via wireless link to the stylus, when the user manipulates a button on the stylus to signal to the operating system of the first PDA that it is ready to receive data. The data is transmitted to the stylus and stored therein. Then, the stylus is aimed at a second PDA and the button is manipulated to cause the stylus to transmit the data to the second PDA via wireless link. With this invention, users of the PDAs can, e.g., quickly and efficiently exchange business cards electronically, without excessive manual data entry and without resorting to connecting their PDAs to a network.

16 Claims, 2 Drawing Sheets

CUT AND PASTE PEN FOR PERVASIVE COMPUTING DEVICES

BACKGROUND OF THE INVENTION

1. Field of the Invention

The present invention relates generally to hand held computing devices, and more particularly to quick and efficient data transfer between two or more hand held computing devices.

2. Description of the Related Art

Hand held computing devices such as personal digital assistants (PDAs) are becoming ubiquitous. PDAs are compact, easily portable devices that provide a great deal of convenient data storage and program execution capability to a person who otherwise might not be able or inclined to access relatively bulkier computers such as a personal computer or a laptop computer. Indeed, the use of hand held computing devices such as PDAs can be expected to continue to grow as the operating systems for the devices, e.g., Palm Operating System, Windows CE, etc., continue to improve, extending the capabilities of the devices.

Thus, it will be appreciated that hand held computing devices such as PDAs can execute many useful software application programs. The present invention recognizes that the usefulness of many such applications is promoted by sharing data between two or more PDAs. As but one example, personal data that conventionally appears on business cards can be stored in PDAs, thereby alleviating the requirement of keeping and maintaining a plethora of hard copy business cards. The present invention recognizes that two people possessing PDAs might want to exchange software versions of their business cards with each other by communicating the data directly from PDA to PDA.

Unfortunately, to communicate data between PDAs, either a user must read the data displayed on one PDA and manually type in the data to input it to a second PDA, or both PDAs must be connected to a computer network to facilitate electronic data transfer. As recognized herein, typing in the data is cumbersome and it wastes time, while an existing computer network might not always be immediately available to the users of PDAs desiring to exchange data. The present invention recognizes that the above-noted shortcomings can be addressed as set forth herein.

SUMMARY OF THE INVENTION

A data transfer device includes a stylus housing, a processor in the housing, and a wireless communication transceiver in the housing under the control of the microprocessor. A data storage device is also in the housing and is accessible by the processor. Further, storage logic means are associated with the processor for causing data received by the transceiver to be stored in the data storage device. Moreover, transmitting logic means associated with the processor cause the data to be user-selectively transmitted by the transceiver.

In a preferred embodiment, a control surface such as a button is engaged with the housing and is manipulable by a user to cause the device to transmit data via the wireless transceiver. If desired, a display can be provided on the housing of the stylus for displaying data in the data storage device.

In one embodiment, the data received by the transceiver is computer-usable digital data. In an alternate embodiment, the data received by the transceiver is optical data, and the storage logic of the stylus processor includes optical character recognition logic for transforming the optical data to computer-usable digital data.

As intended by the present invention, the wireless communication transceiver can be an infrared transceiver or a radiofrequency transceiver. Or, the wireless communication transceiver can be a personal area network (PAN) transceiver.

As disclosed in detail below, the data received by the transceiver of the stylus is received from a hand held computing device, and the data transfer device is disclosed in combination with the hand held computing device. An operating system transfer module can be installed in the hand held computing device for effecting data transfer between the transceiver of the hand held computing device and a data clipboard implemented in the hand held computing device, in response to manipulation of the control surface of the data transfer device.

In another aspect, an operating system module for a hand held computing device having a data storage such as a clipboard, a display, and a wireless data transceiver is disclosed. The operating system module includes logic means for causing data in the data storage to be transmitted by the wireless transceiver in response to a request for data signal received by the transceiver. Furthermore, the operating system module includes logic means for causing data received by the wireless transceiver to be copied into the data storage device.

In still another aspect, a method is disclosed for transferring data between a first computer and a second computer. The method includes pointing a stylus at the first computer, and then transferring data from the first computer to the stylus via a wireless communication link. The stylus is then pointed at the second computer, and the data transferred from the stylus to the second computer via a wireless communication link by appropriately manipulating the stylus.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
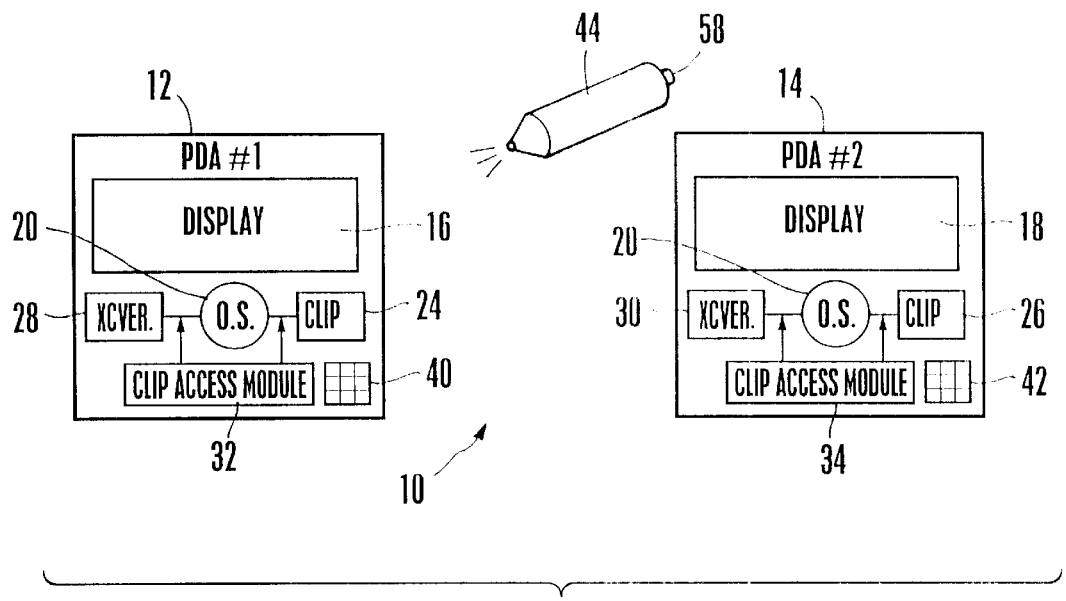
FIG. 1 is a schematic view showing first and second hand held computing devices transmitting data to each other by means of a hand held stylus.

Referring initially to FIG. 1, a system is shown, generally designated 10, for transferring data between first and second computers, and more particularly between first and second hand held computing devices (also referred to as "palm top" computers) such as first and second personal digital assistants (PDAs) 12 and 14. In one intended embodiment, the PDAs 12, 14 may be PDAs made by International Business Machines Corporation (IBM) of Armonk, N.Y. as shown, or they may be any computer, including IBM personal computers or laptop computers.

Each PDA 12, 14 includes a respective display 16, 18, a respective operating system 20, 22, and one or more respective data storages, such as respective clipboards 24, 26. The operating systems 20, 22 can be Palm™ Operating Systems, Windows CE™ operating systems, or other appropriate palm top/hand held computing device operating system. Furthermore, the PDAs 12, 14 include respective wireless communication transceivers 28, 30 with appropriate interface circuitry for communicating with their respective computers. As intended by the present invention, the transceivers 28, 30 can be infrared (IR) transceivers, radiofrequency (RF) transceivers, or personal area network (PAN) transceivers. For example, the transceivers 28, 30 can be PAN transceivers that operate in accordance with the principles set forth in U.S. Pat. No. 5,796,827 to Coppersmith et al., owned by the present assignee and incorporated herein by reference.

In accordance with the present invention, each PDA 12, 14 also includes a respective clipboard access module 32, 34. Each clipboard access module 32, 34 is a software-implemented operating system adjunct module that is added to the respective native operating system 20, 22 for effecting data transfer between the respective clipboard 24, 26 and respective transceiver 28, 30 in accordance with principles set forth below.

The clipboard access module of the present invention represents logic elements that may be executed by a processor embodying the operating system of the PDA as a series of computer-executable instructions. These logical instructions may reside, for example, in RAM of the PDA 12, 14, or on an application specific integrated circuit (ASIC) chip in the PDA 12, 14.

Figure 2:
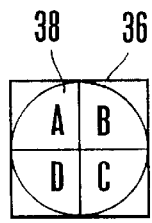
FIG. 2 is a schematic diagram of a computer program storage device.

Alternatively, the instructions may be contained on a data storage device with a computer readable medium, such as a computer diskette 36 having a computer storage medium 38 containing computer program code elements A–D in accordance with the present invention, as shown in FIG. 2. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

FIG. 1 also shows that each PDA 12, 14 can include one or more respective input devices such as a respective computer keyboard or keypad 40, 42. Input devices other than the keyboard or keypad 40, 42 can be used, e.g., a mouse, or trackballs, touch screens, and voice recognition devices. Indeed, in the preferred embodiment the displays 16, 18 are touchscreens.

Figure 3:
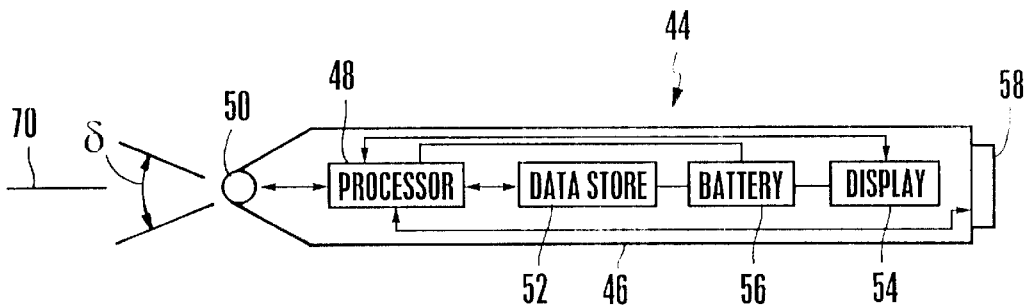
FIG. 3 is a schematic diagram of the present stylus.

To effect wireless data transfer between the PDAs 12, 14, a stylus 44 can be manipulated by a user as described below to copy data from the first PDA 12 and transfer it to the second PDA 14, and vice-versa. FIG. 3 shows the details of the present stylus 44.

As shown in FIG. 3, the stylus 44 is a hand held device that includes a hollow rigid generally cylindrical metal or plastic stylus housing 46. A digital processor 48 is mounted in the housing 46, and the processor 48 communicates with a wireless communication transceiver 50 that is also mounted in the housing 46, with the microprocessor 48 controlling the transceiver 50. It is to be understood that the transceiver 50 is configured complementarily to the particular type of transceivers 28, 30 of the PDAs 12, 14, such that a communication link can be established between the stylus 44 and each one of the PDAs 12, 14. Thus, the transceiver 50 can be an IR transceiver, RF transceiver, PAN transceiver, a combination thereof, or other appropriate transceiver.

Additionally, a data storage device 52 is mounted in the housing 46 and is accessible by the processor 48 as shown. Moreover, a display 54 can be provided on the housing 46 for displaying data in the data storage device 52. One or more batteries 56 are mounted in the housing and are electrically connected to the electrical components therein to energize the components.

As set forth further below in reference to FIG. 4, storage logic is associated with the processor 48 for causing data received by the transceiver 50 to be stored in the data storage device 52. Moreover, transmitting logic is associated with the processor 48 for causing the data to be transmitted by the transceiver 50. The storage logic and transmitting logic are invoked when a user appropriately manipulates a control surface 58 that is coupled to the processor 48. In one preferred embodiment, the control surface 58 is established by a spring-loaded button that reciprocates on the housing 46, although other control surfaces such as slides, toggles, etc. can be used.

In the preferred embodiment, the data to be received from the first PDA 12 by the transceiver 50 of the stylus 44 is computer-usable digital data. That is, it is data that has been stored in a computer usable medium and rendered for transmission to the stylus 44 in accordance with digital data communication principles.

Figures 4, 5:
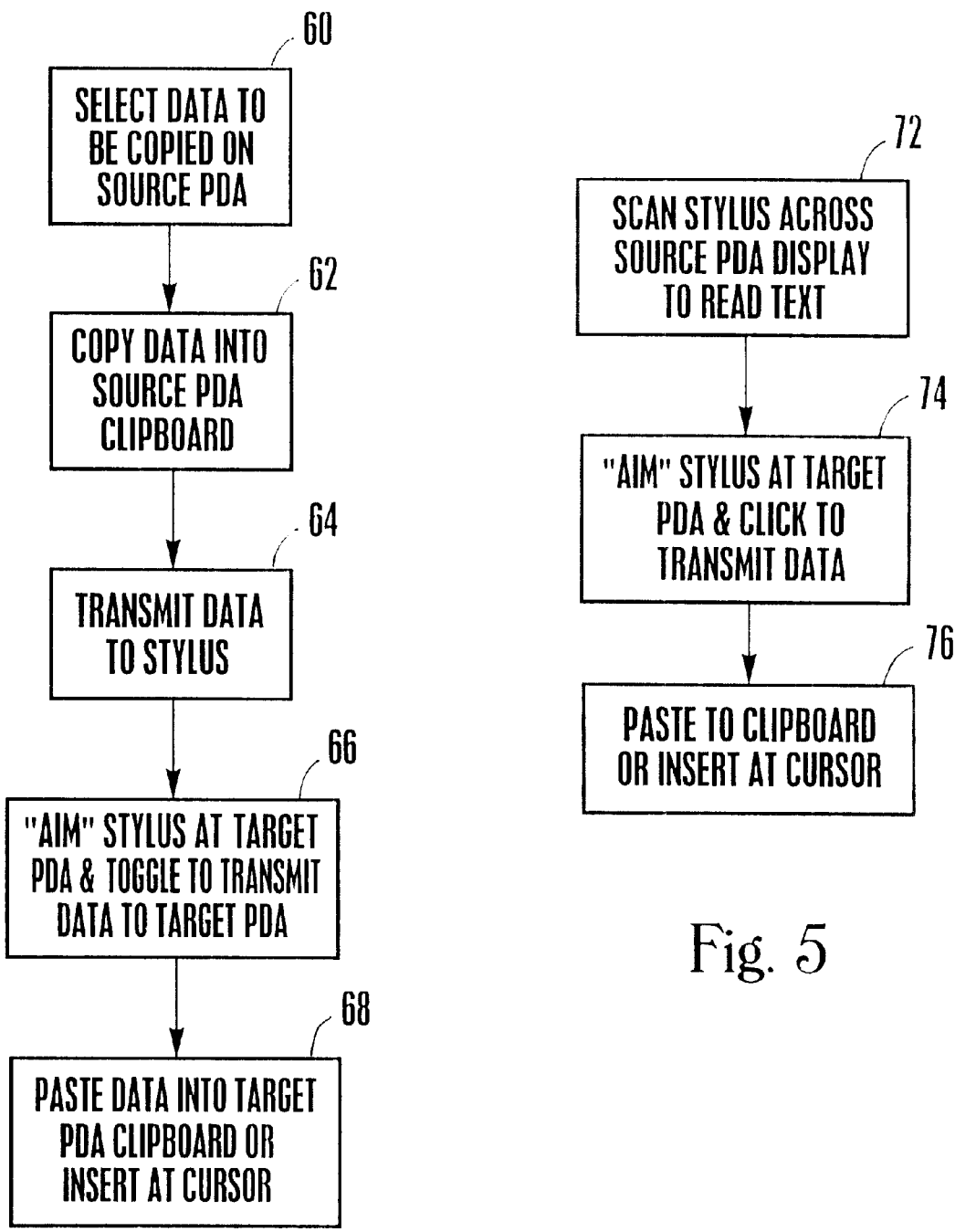
FIG. 4 is a flow chart showing the logic of the present invention.
FIG. 5 is a flow chart showing alternate logic of the present invention.

FIG. 4 shows the logic of the above-mentioned embodiment. Commencing at block 60, data to be copied to the second, or target, PDA 14 is selected on the first, or source, PDA 12. To select this data, the user can highlight the data using the keypad 40 of the first PDA 12 in accordance with principles known in the art. Or, the user can move the stylus 44 against the pressure-sensitive display 16 of the first PDA 12 over the data sought to be transferred.

Once the data has been selected, the logic moves to block 62 to copy the data into the clipboard 24 or other data storage device of the first PDA 12. This transfer can occur by using the conventional data copy or data cut provisions of the editor of the operating system 20 of the first PDA 12, or it can occur automatically when, for example, the user depresses the control surface 58 of the stylus 44. Such a manipulation of the control surface 58 causes the processor 48 of the stylus 44 to transmit a request for data signal via the transceivers 50, 28 to the clipboard access module 32, which in turn executes the copy function.

Moving to block 64, the clipboard access module 32 transmits the data in the clipboard 24 to the processor 48 of the stylus 44 via the transceivers 28, 50. The processor 48 causes the data to be stored in the data storage device 52. To invoke the transmission, the user can, e.g., double click the control surface 58. Alternatively, when the user has depressed the control surface 58 to invoke the copy function as described above, the clipboard access module 32 can automatically transmit the data from the clipboard 24 to the stylus 44 without further signalling from the stylus 44.

Proceeding to block 66, the user aims the stylus 44 generally at the second, or target, PDA 14 and then depresses the control surface 58. When the control surface 58 is depressed, the processor 48 of the stylus 44 causes the data in the data storage device 52 to be sent, via the transceivers 50, 30, to the clipboard access module 34 of the second PDA 14. At block 68, the clipboard access module 34 of the second PDA 14 pastes the data into the clipboard 26 of the second PDA 14, or it inserts the data into whatever document happens to be open in the second PDA 14, at the current cursor position of the second PDA 14, as desired by the user.

To avoid the transfer of data to a device with which it is not intended to communicate, the transmission power of the stylus transceiver 50 is relatively low. Moreover, the transmission beam of the stylus 44 is narrow. More specifically, referring back to FIG. 3 the stylus 44 defines a long axis 70, and the transmission beam covers a conical half angle θ (i.e., the angle outside of which transmission power is less than 50% of what it is along the axis 70) of about thirty degrees, centered on the axis 70. Thus, in one preferred embodiment the angle between the axis 70 and a line of sight between the stylus 44 and, e.g., a PDA transceiver is no more than thirty degrees, and preferably is no more than fifteen degrees (i.e., one half θ), to effect directional communication between the stylus 44 and the transceiver.

If desired, multiple messages can be held in the data storage device 52 of the stylus 44. The user can select which message to transmit by toggling through the various messages as presented on the display 54 and then selecting the message sought to be transmitted by, e.g., double clicking the button 58. Various combinations of button clicks, button hold-down, etc. can be used as desired to control data transfer via the stylus 44. For example, a single button click can cause the first PDA 12 to transmit data to the stylus 44, and a subsequent double click can then cause the stylus 44 to transmit the data to the second PDA 14. Or, the control surface (button) 58 can be held down to receive data from the first PDA 12 and then released to transmit the data to the second PDA 14.

FIG. 5 shows an alternate embodiment in which the stylus transceiver 50 is a hybrid transceiver that can include, for example, an optical character recognition (OCR) device and an IR or RF transmitter. It is to be understood that in such an embodiment, the data received by the stylus 44 is optical data, and the processor 48 includes logic for transforming the optical data to computer-usable digital data. In other words, the processor 48 can include optical character recognition logic that operates in accordance with optical recognition principles known in the art.

Commencing at block 72 of FIG. 5, the user scans the stylus 44 across the display 16 of the first, or source, PDA 12 to read text displayed therein in accordance with OCR principles known in the art. The optical data so read is transformed by the processor 48 to digital data, also in accordance with OCR principles known in the art, and stored in the data storage device 52 of the stylus 44.

Proceeding to block 74, the user aims the stylus 44 generally at the second, or target, PDA 14 and then depresses the control surface 58 to cause the data in the data storage device 52 to be sent, via the transceivers 50, 30, to the clipboard access module 34 of the second PDA 14. At block 76, the clipboard access module 34 of the second PDA 14 pastes the data into the clipboard 26 of the second PDA 14, or it inserts the data into whatever document happens to be open in the second PDA 14, at the current cursor position of the second PDA 14, as desired by the user.

While the particular CUT AND PASTE PEN FOR PERVASIVE COMPUTING DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A data transfer device, comprising:
    a stylus housing;
    a processor in the housing;
    a wireless communication transceiver in the housing under the control of the processor;
    a memory in the housing accessible by the processor;
    a display on the housing for displaying at least some data in the memory, at least some of the data stored in the memory and presented on the display being text;
    storage logic means associated with the processor for causing data received by the transceiver to be stored in the memory, at least some of the data received by the transceiver being text; and
    transmitting logic means associated with the processor for causing the data to be user-selectively transmitted by the transceiver, wherein the data received by the transceiver is optical data, and wherein the storage logic means includes optical character recognition logic for transforming the optical data to computer-usable digital data.

2. The data transfer device of claim 1, further comprising a control surface engaged with the housing and manipulable by a user to cause the device to transfer data via the wireless transceiver.

3. The data transfer device of claim 1, wherein the data received by the transceiver is computer-usable digital data.

4. The data transfer device of claim 1, wherein the wireless communication transceiver is an infrared transceiver or a radiofrequency transceiver.

5. The data transfer device of claim 1, wherein the wireless communication transceiver is a personal area network (PAN) transceiver.

6. The data transfer device of claim 1, wherein the data received by the transceiver is received from a hand held computing device, and the data transfer device is further in combination with an operating system transfer module installable in the hand held computing device for effecting data transfer between a transceiver on the band held computing device and a data clipboard implemented in the hand held computing device at least partially in response to manipulation of the control surface of the data transfer device.

7. The combination of claim 6 further combination with the hand held computing device.

8. An operating system module for a hand held computing device having a data storage such as a clipboard, a display, and a wireless data transceiver, comprising:
    logic means for causing text data in the data storage to be transmitted by the wireless transceiver in response to a request for data signal received by the transceiver;
    logic means for causing data received by the wireless transceiver to be copied into the data storage device; and
    a hand held stylus communicating via a wireless link, the request for data signal being generated by the hand held stylus, a display being located on the stylus for displaying at least some text data in the data storage device and read by the stylus, wherein the data received by the stylus is optical data displayed by the hand held computing device, and wherein the storage logic means includes optical character recognition logic for transforming the optical data to computer-usable digital data.

9. The combination of claim 8, wherein the hand held stylus includes:

a stylus housing;

a processor in the housing;

a wireless communication transceiver in the housing under the control of the processor;

a data storage device in the housing accessible by the processor;

storage logic means associated with the processor for causing data from the hand held computing device received by the transceiver to be stored in the data storage device; and transmitting logic means associated with the processor for causing data to be user-selectively transmitted by the transceiver to the hand held stylus.

10. The combination of claim 9, further comprising a control surface engaged with the housing and manipulable by a user to cause the stylus to transfer data via the wireless transceiver.

11. The combination of claim 9, wherein the data received by the stylus from the hand held computing device is computer-usable digital data.

12. The combination of claim 9, wherein the wireless communication transceiver is an infrared transceiver or a radiofrequency transceiver.

13. The combination of claim 9, wherein the wireless communication transceiver is a personal area network (PAN) transceiver.

14. A method for transmitting data at least some of which is text data from a source computing device to a target computing device, comprising:

scanning a stylus across a display of the source computing device to read text displayed thereon;

displaying at least portions of the text on the stylus;

storing at least portions of the text as data in a data storage device of the stylus;

aiming the stylus generally at the target computing device; and causing at least some of the data in the data storage device to be sent via wireless link to the target computing device, wherein the data includes optical data, and wherein the method includes using optical character recognition to transform the optical data to computer-usable digital data.

15. The method of claim 14, further comprising pasting the text into a clipboard of the target computing device.

16. The method of claim 14, further comprising inserting the text into an open document in the target computing device.

* * * * *